United States Patent
Zhang et al.

(10) Patent No.: US 10,244,450 B2
(45) Date of Patent: Mar. 26, 2019

(54) HANDOVER FOR COVERAGE ENHANCEMENT

(71) Applicant: Nokia Technologies Oy, Espoo (FI)

(72) Inventors: Yanji Zhang, Beijing (CN); Haitao Li, Beijing (CN); Benoist Sebire, Tokyo (JP); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/333,406

(22) Filed: Oct. 25, 2016

(65) Prior Publication Data
US 2017/0135012 A1 May 11, 2017

(30) Foreign Application Priority Data
Nov. 6, 2015 (WO) ................ PCT/CN2015/093987

(51) Int. Cl.
*H04W 36/00* (2009.01)
*H04W 36/16* (2009.01)
(Continued)

(52) U.S. Cl.
CPC ..... *H04W 36/165* (2013.01); *H04W 36/0077* (2013.01); *H04W 36/0088* (2013.01); *H04W 36/38* (2013.01); *H04W 48/16* (2013.01); *H04W 72/042* (2013.01); *H04W 74/0833* (2013.01); *H04W 92/20* (2013.01)

(58) Field of Classification Search
CPC ........... H04W 72/042; H04W 72/0413; H04W 72/0446; H04W 74/0833; H04W 24/10; H04W 84/042
See application file for complete search history.

(56) References Cited

U.S. PATENT DOCUMENTS

| 2010/0124179 A1* | 5/2010 | Lee | ........................ | H04W 48/08 370/252 |
| 2014/0098761 A1* | 4/2014 | Lee | ...................... | H04W 74/006 370/329 |

(Continued)

FOREIGN PATENT DOCUMENTS

| CN | 104184548 A | 12/2014 |
| CN | 104519591 A | 4/2015 |
| CN | 104780617 A | 7/2015 |

OTHER PUBLICATIONS

"Revised WI: Further LTE Physical Layer Enhancements for MTC", 3GPP TSG RAN Meeting #67, RP-150492, Agenda: 11.3.2, Ericsson, Mar. 9-12, 2015, 8 pages.

(Continued)

*Primary Examiner* — Khalid W Shaheed
(74) *Attorney, Agent, or Firm* — Harrington & Smith

(57) ABSTRACT

A method including transmitting signals from a first base station to a second base station in a network; and during an interface setup or an interface update between the first base station and the second base station, receiving by the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

17 Claims, 5 Drawing Sheets

(51) Int. Cl.
   *H04W 36/38* (2009.01)
   *H04W 48/16* (2009.01)
   *H04W 72/04* (2009.01)
   *H04W 74/08* (2009.01)
   *H04W 92/20* (2009.01)

(56) References Cited

U.S. PATENT DOCUMENTS

| | | | |
|---|---|---|---|
| 2015/0181576 A1* | 6/2015 | Papasakellariou | H04L 5/0053 370/329 |
| 2015/0215911 A1* | 7/2015 | Dimou | H04W 48/12 370/329 |

OTHER PUBLICATIONS

"Report of the email Discussion [91#25][LTE/MTCe2]", 3GPP TSG-RAN WG2 Meeting #91bis, R2-154784, Agenda: 7.4.5, Mediatek Inc, Oct. 5-9, 2015, pp. 1-25.

"3rd Generation Partnership Project; Technical Specification Group Radio Access Network; Evolved Universal Terrestrial Radio Access Network (E-UTRAN); X2 application protocol (X2AP) (Release 13)", 3GPP TS 36.423, V13.1.0, Sep. 2015, pp. 1-216.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.1.0, Sep. 2015, pp. 1-254.

"Final Report of RAN1#80 Meeting", 3GPP TSG Ran WG1 Meeting #80bis, R1-151454, MCC Support, Apr. 20-24, 2015, pp. 1-91.

"Mobility Enhancment for Small Cell", 3GPP TSG-RAN2 Meeting#81, R2-130135, Agenda: 7.2, ZTE Corporation, Jan. 28-Feb. 1, 2013, pp. 1-8.

International Search Report and Written Opinion received for corresponding Patent Cooperation Treaty Application No. PCT/CN2015/093987, dated Jul. 26, 2016, 13 pages.

* cited by examiner

HANDOVER FOR COVERAGE ENHANCEMENT

BACKGROUND

Technical Field

The exemplary and non-limiting embodiments relate generally to wireless communication and, more particularly, to handover.

Brief Description of Prior Developments

Procedures for handover of a user equipment (UE) from a first base station to a second base station are known. The Third Generation Partnership Program (3GPP) has proposed coverage enhancement (CE) for Machine Type Communications (MTC) in LTE. 3GPP standards include CE levels and CE level criteria.

SUMMARY

The following summary is merely intended to be exemplary. The summary is not intended to limit the scope of the claims.

In accordance with one aspect, an example method comprises transmitting signals from a first base station to a second base station in a network; and during an interface setup or an interface update between the first base station and the second base station, receiving by the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in an apparatus comprising at least one processor; and at least one non-transitory memory including computer program code, the at least one memory and the computer program code configured to, with the at least one processor, cause the apparatus to: transmit signals from the apparatus to a second base station in a network; and during an interface setup or an interface update between the apparatus and the second base station, where the apparatus is at least part of a first base station, receive information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in a non-transitory program storage device readable by a machine, tangibly embodying a program of instructions executable by the machine for performing operations, the operations comprising: transmitting signals from a first base station to a second base station in a network; and during an interface setup or an interface update between the first base station and the second base station, receiving information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example method comprises transmitting signals from a second base station to a first base station in a network; and during an interface setup or an interface update between the first base station and the second base station, transmitting by the second base station to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in an apparatus comprising at least one processor; and at least one non-transitory memory including computer program code, the at least one memory and the computer program code configured to, with the at least one processor, cause the apparatus to: transmit signals from a second base station to a first base station in a network; and during an interface setup or an interface update between the first base station and the second base station, where the apparatus is at least part of the second base station, transmit to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in a non-transitory program storage device readable by a machine, tangibly embodying a program of instructions executable by the machine for performing operations, the operations comprising transmitting signals from a second base station to a first base station in a network; and during an interface setup or an interface update between the first base station and the second base station, transmitting to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example method comprises receiving by a user equipment (UE) from a first base station a handover command comprising information regarding coverage enhancement (CE) related physical random access channel (PRACH) resources; and transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

In accordance with another aspect, an example embodiment is provided in an apparatus comprising at least one processor; and at least one non-transitory memory including computer program code, the at least one memory and the computer program code configured to, with the at least one processor, cause the apparatus to: receive from a first base station a handover command comprising information regarding coverage enhancement (CE) related physical random access channel (PRACH) resources; and transmit a signal to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

In accordance with another aspect, an example embodiment is provided in a non-transitory program storage device readable by a machine, tangibly embodying a program of instructions executable by the machine for performing operations, the operations comprising: receiving from a first base station a handover command comprising information regarding coverage enhancement (CE) related physical random access channel (PRACH) resources; and transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

In accordance with another aspect, an example embodiment is provided in an apparatus comprising means for transmitting signals from a first base station to a second base station in a network; and means for receiving by the first base station, during an interface setup or an interface update between the first base station and the second base station, information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in an apparatus comprising means for transmitting signals from a second base station to a first base station in a network; and means for transmitting by the second base station to the first base station, during an interface setup or an interface update between the first base station and the second base station, information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

In accordance with another aspect, an example embodiment is provided in an apparatus comprising means for receiving by a user equipment (UE) from a first base station a handover command comprising information regarding coverage enhancement (CE) related physical random access channel (PRACH) resources; and means for transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
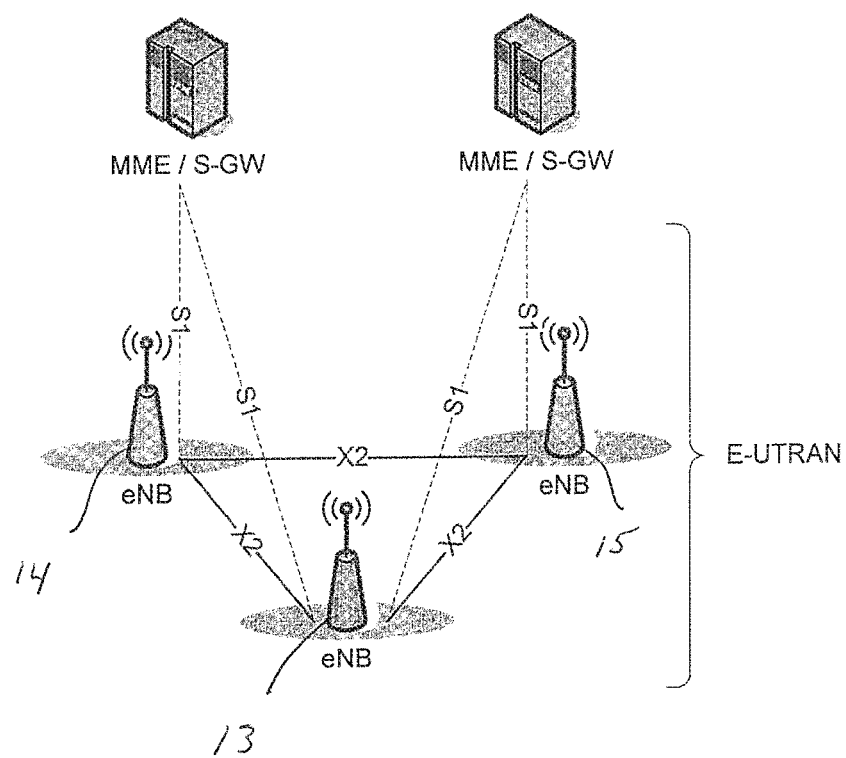
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

The following abbreviations that may be found in the specification and/or the drawing figures are defined as follows:

3GPP Third Generation Partnership Program
AP Access Point
ACK Acknowledgement
ARQ Automatic Repeat Request
CE Coverage Enhancement
CSI Channel State Information
CSM Cluster Set Manager
DL Downlink
DTX Discontinuous Transmission
EC Enhanced Coverage
eNB enhanced Node B (base station according to LTE terminology)
E-UTRAN E-Universal Terrestrial Radio Access Network
HO Handover
LC Low Complexity or Low Cost
LTE Long-Term Evolution
MTC Machine Type Communication
NACK Negative acknowledgement
PRACH Physical Random Access Channel
RA Random Access
RACH Random Access CHannel
Rel-13 3GPP Standard Release 13
RLF Radio Link Failure
RLM Radio Link Monitoring
RRC Radio Resource Control
SIB System Information Block
SINR Signal-to-Interference and Noise Ratio
SNR Signal-to-Noise Ratio
TDD Time division duplex
UE User Equipment
UL Uplink
X2 X2 Interface FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs. One or more of the eNB may form an access point (AP) or base station.

Figure 2:
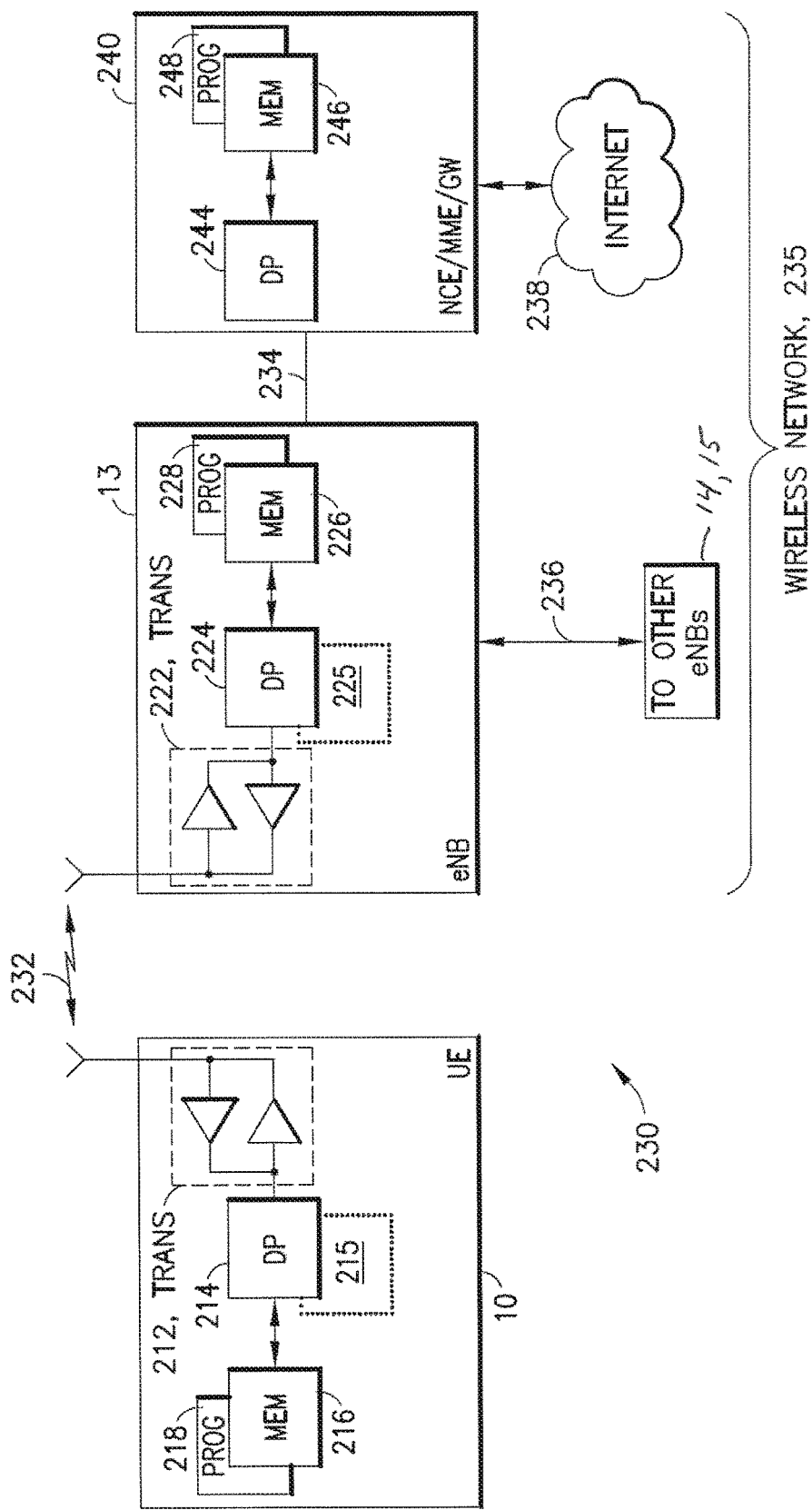
FIG. 2 is a diagram illustrating some components of the wireless system shown in FIG. 1.

Referring also to FIG. 2, a user equipment (UE) 10 is shown. In this example the UE 10 is a smartphone. However, in alternate examples the UE may be, for example, a tablet computer, a PDA, a smart watch, or any other suitable device configured for wireless communications including, for example, in a vehicle such as a car. The UE 10 is configured to be able to communicate with the base stations (BS) 13, 14, 15.

The wireless system 230 comprise a wireless network 235 adapted for communication over a wireless link 232 with an apparatus, such as the mobile communication device which may be referred to as a UE 10, via the eNB 13. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface. The eNB 13 may also be coupled to other eNB(s) via data/control path 236 also known as the X2 interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware).

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Extending LTE coverage from a normal coverage mode (i.e., a non-CE mode) to a coverage enhancement (CE) mode allows LTE to be used for services such as smart metering, where the meters may be installed in basements or shielded locations, and thus may be subject to substantial penetration loss. MTC devices are sometimes referred to as low-cost or low-complexity devices because they do not require all the hardware and programming a non-MTC device may have. A low cost MTC device may suffer from coverage degradation due to some restrictions, e.g. the reduced bandwidth and the single RX, etc. However, devices which use a coverage enhancement (CE) mode rather than a normal coverage mode of communication are envisioned which may be mobile and, therefore, will need a handover capability. Thus, mobility support for "Low Complexity/Enhanced Coverage" (LC/EC) UEs will be needed.

Low power consumption and low cost are important aspects for large-scale deployment of CE capable devices. To provide sufficient coverage of MTC devices, or MTC user equipments (UEs), special coverage enhancement (CE) considerations may be needed. These coverage enhancements may include a desired coverage enhancement level for various physical channels of communication. For example, in some instances physical uplink channels and physical downlink channels such as, for example, physical downlink control channel (PDCCH), physical uplink shared channel (PUSCH), etc. may be configured to achieve a desired coverage enhancement level, or decibel (dB) gain in signal power. A required CE level can be different for different eNBs, for example depending on an eNB transmission power or an associated cell size, as well as for different UEs, for example depending on a location of a UE or on a number of UE receiver antennas.

Features as described herein provide an improvement to exchange of information over an X2 interface for supporting a reliable handover procedure for a 3GPP low-cost (low complexity) UE and a UE in a coverage enhancement mode, such as for 3GPP Rel-13 for example.

During a X2 interface setup procedure (or during a X2 interface update procedure), a source eNB and a target eNB may exchange information about their capabilities, such as, for example:

whether coverage enhancement is supported, the supported maximum CE level and optionally the CE level criteria (i.e. the threshold(s) to decide the CE level based on the measurement result);

whether a low-cost type of UE is supported

Such information may be used by the source eNB to decide potential coverage status in a target eNB, configure CE-specific measurement configurations and decide the CE level in the target eNB based on a measurement result from the UE. This also helps the source eNB to make handover decisions when preparing a handover towards multiple target cells with different CE conditions.

During the Handover procedure an additional flag indicating whether the UE will work in a CE mode or/and the CE level of the UE may be added in a Handover Request message by the source eNB. The configuration of Random Access (RA) procedure (including CE related Physical Random Access Channel (PRACH) resources) towards the target eNB may be added by the target eNB in a Handover Request Acknowledge as part of a RRC container. PRACH resource information may include, for example, time, frequency and preamble related information. As different sets of PRACH resources (e.g. time, frequency and preamble) are associated with each EC level, and also the PRACH resource for EC UEs is separated from the normal coverage UEs, that information could enable the target eNB to allocate the RA resource reflecting the practical UE coverage situation in the target eNB correctly; to ensure a successful RA procedure towards the target eNB during the handover procedure. Please note that any combination of above may be considered. Alternatively, instead of signaling the CE level criteria (i.e. the threshold(s) to decide the CE level based on the measurement result), the measurement results from the UE can be included in the Handover Request message; allowing the target eNB to decide the CE level of the UE. PRACH resources may be assigned per CE level and/or PRACH resources may be assigned per "UE type" (such as low-cost UE versus non-low-cost UE for example).

Figure 3:
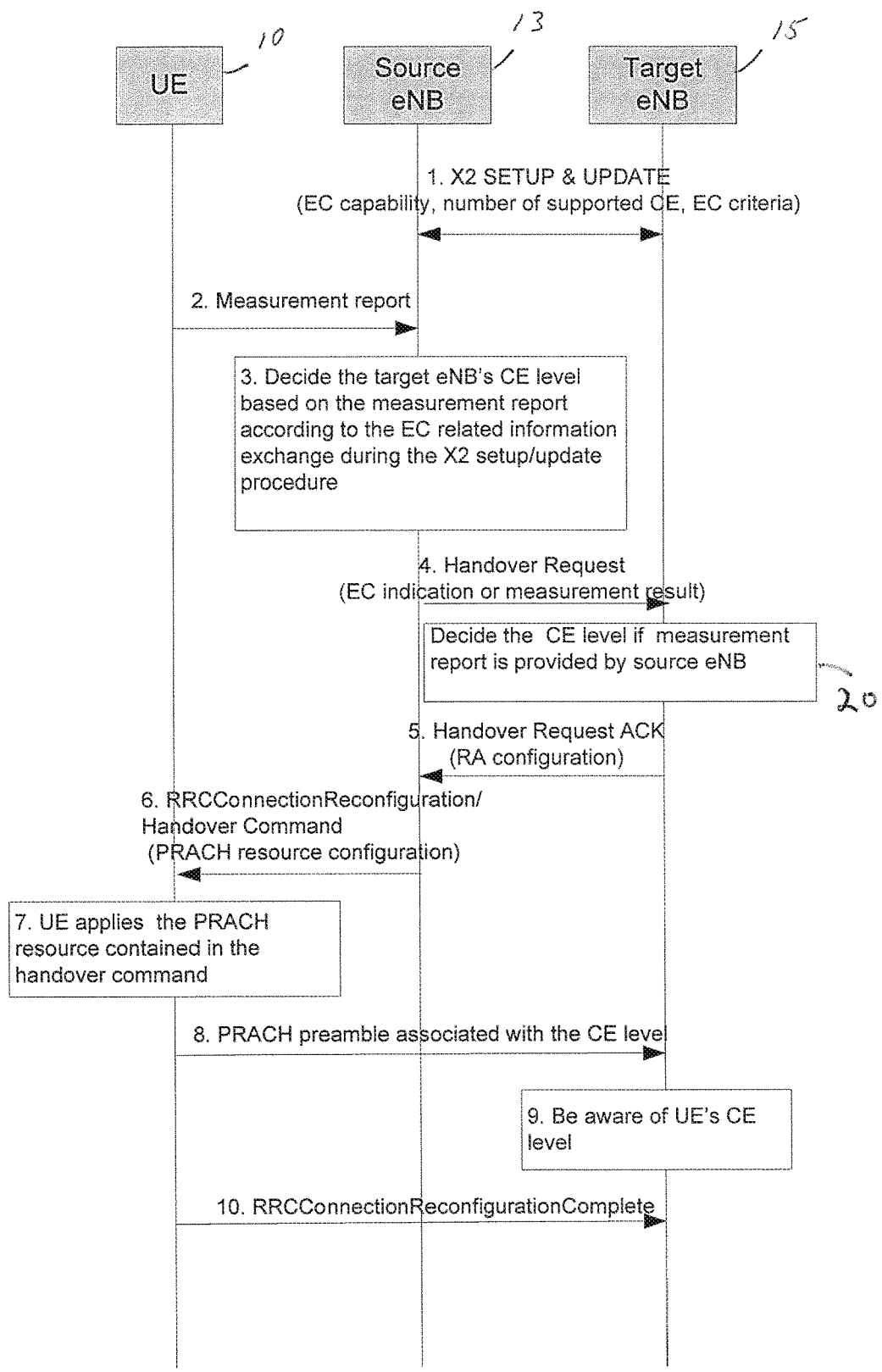
FIG. 3 is a diagram illustrating an example handover procedure for a UE in a coverage enhancement mode.

Referring also to FIG. 3, an example will be described. At Step 1, during the X2 setup or update procedure, the source eNB 13 and the target eNB 15 exchange at least one of:
the capability whether coverage enhancement is supported
the supported maximum CE level
the capability whether low-cost (LC) UE is supported (by providing a separate PRACH resource for LC UEs versus non-low-cost UEs)
the CE level criteria (for example, the thresholds to decide the CE level based on measurement results).

At Step 2 the UE triggers a measurement report sent to the source eNB 13. At Step 3 the source eNB 13 makes a decision based upon the received MEASUREMENT REPORT and the CE configuration of the cells of the neighbouring base stations 14, 15 exchanged during the X2 setup/update procedure. The source eNB 13 detects the UE's CE level for the neighboring cells according to the cell specific CE level criteria. The source eNB 13 may select the suitable target eNB based on the CE level, such as:
The cell in which the UE works in normal coverage has highest priority, and
If the UE is to work in the CE mode rather than the normal coverage mode, the cell in which UE works with a low CE level has the highest priority.

At Step 4 when the source eNB 13 determines that the CE level for the UE in the target eNB would be better than that in the source cell, the source eNB 13 decides to prepare handover. A one bit EC indicator or the EC level indicator may be added in the Handover Request. Alternatively, the source eNB 13 could provide the measurement result to the target eNB 15. The target eNB 15 may then use that measurement result to decide the UE's CE level.

At Step 5 the target eNB may add the CE related physical random access channel (PRACH) resources in the Handover Request Acknowledge as part of the RRC container. This may include the PRACH resource allocated for UE operating in normal coverage, and the PRACH resource associated with the UE specific EC level in the target cell. The PRACH resource may include the time/frequency allocation and dedicated preambles. Either all PRACH resource associated with all possible CE levels may be added or only the PRACH resource corresponding to the estimated CE of the incoming UE might be added.

At Steps 6-10 the handover procedure in the air interface is performed. The UE accesses the target cell with the RA procedure using the assigned PRACH resources associated with its CE level in the target cell; contained in the RRC Connection Reconfiguration message. The PRACH resource may include the time/frequency allocation and dedicated preambles. According to the PRACH resource, the target eNB is aware of the UE in the EC mode, and the CE level which could be applied for resource scheduling.

In the example shown in FIG. 3, step 9 (which corresponds to the target eNB 15 being aware of the UE's CE level) is shown occurring after step 8 (after the UE 10 transmitting the PRACH preamble associated with the CE level to the Target eNB 15). However, if step 4 contains the measurement report, the block 20 "Decide the CE level if measurement is provided by source eNB" would imply that the target eNB 15 will be aware of the UE's CE level. So, with this alternate example, the occurrence of the target eNB 15 being aware of the UE's CE level may occur between steps 4-5 rather than between steps 8-10. Thus, the target eNB 15 being aware of the UE's CE level may occur either after step 4 or after step 8; depending on the information carried in the Handover request from source eNB to target eNB.

X2 Interface Update:

In the X2 setup/update procedure, additional parameters may be exchanged between eNBs, such as:
The capability whether coverage enhancement is supported
The supported maximum CE level
The capability whether low-cost UE is supported (there is separate PRACH resource for LC UEs)
The CE level criteria, i.e. the thresholds to decide the CE level based on the measurement result.

A one bit EC indicator or the EC level indicator may be added in the Handover Request, or the measurement result may be added in the Handover Request.

Additional PRACH resources may be added in the Handover Request Acknowledge as part of the RRC container. The PRACH resource may be allocated for UE operating in a normal coverage mode. The PRACH resource may be allocated for a LC UE. The PRACH resource may be associated with the UE specific EC level in the target cell. The PRACH resource may be associated with the LC UE. In addition, any combination(s) of above may be considered.

With features as described herein, the proposed solution helps to ensure a reliable handover procedure for a 3GPP Rel-13 low complexity UE and a UE in coverage enhancement mode for the selection of a suitable target cell when source eNB makes the handover decision, and the correct PRACH resource utilization when the UE performs the RA towards the target eNB.

During a traditional handover procedure, the source eNB makes a decision and selects a suitable target eNB based on the MEASUREMENT REPORT and the Radio Resource Management (RRM) information to handoff the UE. During the handoff procedure, the source eNB issues a HANDOVER REQUEST message to the target eNB passing necessary information to prepare the handover at the target side. After performing the Admission Control, the target eNB sends the HANDOVER REQUEST ACKNOWLEDGE to the source eNB which includes a transparent container to be sent to the UE as an RRC message to perform the handover. After receiving the RRCConnectionReconfiguration message, the UE performs synchronization to target eNB and accesses the target cell via RACH. However, the conventional handover procedure does not take into consideration the new type of low-complexity UE and UE capable of EC operation in LTE; to support coverage enhancement (CE) for both Rel-13 low-complexity UE and UE operating in CE compared to existing LTE networks.

Baseline connected mode mobility mechanisms may be supported for LC UEs in normal coverage and LC UEs in "shallow" enhanced coverage. Ideally, the source eNB should prioritize the cells in which the UE is able to operate in normal coverage over cells in which the UE has to use enhanced coverage or to select the cells that UE works in low CE level when making the handover decision. A threshold for deciding the CE level is cell specific. With existing specification handover procedures, the source eNB has no knowledge of whether the neighboring eNB could support the coverage enhancement and the related coverage enhancement configuration, e.g. the cell specific CE level criteria, etc. Without such information, the source eNB could not select the suitable target eNB. As a consequence, it may make a wrong decision and request a handover to a CE incapable eNB or an eNB which the UE may work in a worst coverage situation. This may cause extra signaling overhead due to the increased number of transmission repetitions and even an unsuccessful handover procedure in a worst case scenario. Furthermore, after receiving the RRCConnection-Reconfiguration message, the UE performs synchronization to the target eNB and accesses the target cell via RACH. With one-to-one mapping between PRACH repetition level and PRACH resource set, the UE needs to know the correct PRACH resource associated with its CE level in the target cell to ensure a successful RA and subsequent procedures with the target eNB.

With features as described herein, the problems noted above are overcome. Information exchanged at the X2 interface setup or X2 interface update between the base stations may be used to select a proper target base station with the best CE capabilities and proper CE level for the particular "type" of UE being handed over. For example, the handover procedure may involve distinguishing handover of a low-cost UE versus a non-low-cost UE or handover of UE working in enhanced coverage versus working in normal coverage.

Figure 4:
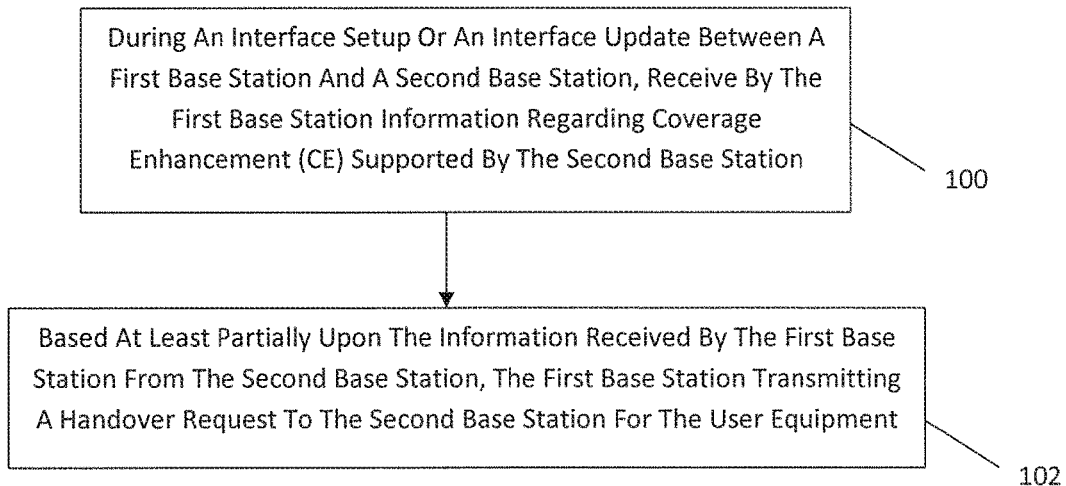
FIG. 4 is a block diagram illustrating an example method.

Referring also to FIG. 4, an example method may comprise, during an interface setup or an interface update between a first base station and a second base station, receiving by the first base station information regarding coverage enhancement (CE) supported by the second base station as indicated by block 100; and based at least partially upon the information received by the first base station from the second base station, the first base station transmitting a handover request to the second base station for the user equipment as indicated by block 102. The information may comprise at least one of:

whether coverage enhancement (CE) is supported by the second base station,
a maximum coverage enhancement (CE) level supported by the second base station,
whether low-cost coverage enhancement (CE) is supported by the second base station, and
coverage enhancement (CE) level criteria at the second base station.

Figure 5:
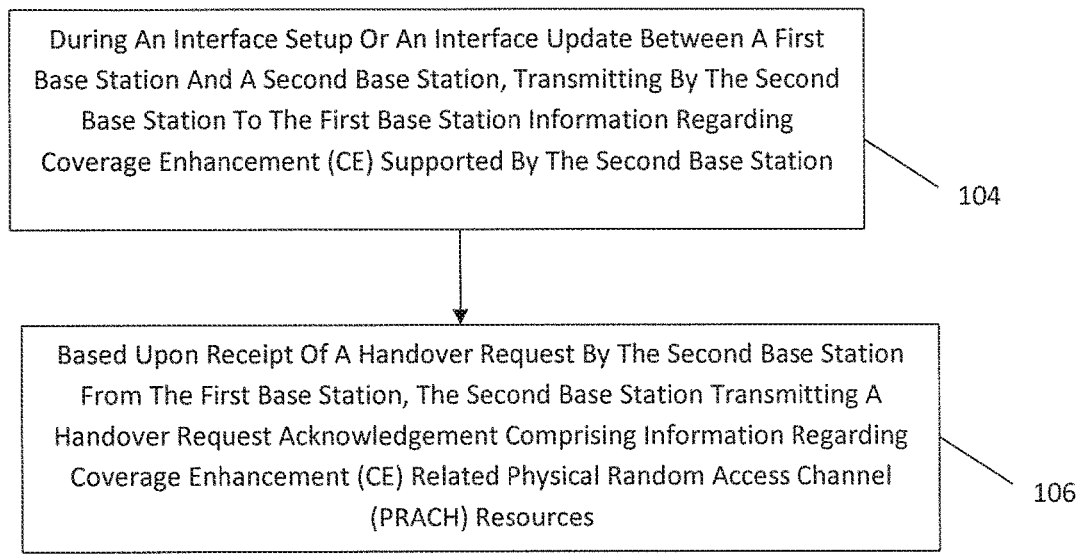
FIG. 5 is a block diagram illustrating an example method.

Referring also to FIG. 5, an example method may comprise during an interface setup or an interface update between a first base station and a second base station, transmitting by the second base station to the first base station information regarding coverage enhancement (CE) supported by the second base station as indicated by block 104; and based upon receipt of a handover request by the second base station from the first base station, the second base station transmitting a handover request acknowledgement comprising information regarding coverage enhancement (CE) related physical random access channel (PRACH) resources as indicated by block 106. The information regarding coverage enhancement (CE) supported by the second base station may comprise at least one of:

whether coverage enhancement (CE) is supported by the second base station,
a maximum coverage enhancement (CE) level supported by the second base station,
whether low-cost coverage enhancement (CE) is supported by the second base station, and
coverage enhancement (CE) level criteria at the second base station.

Figure 6:
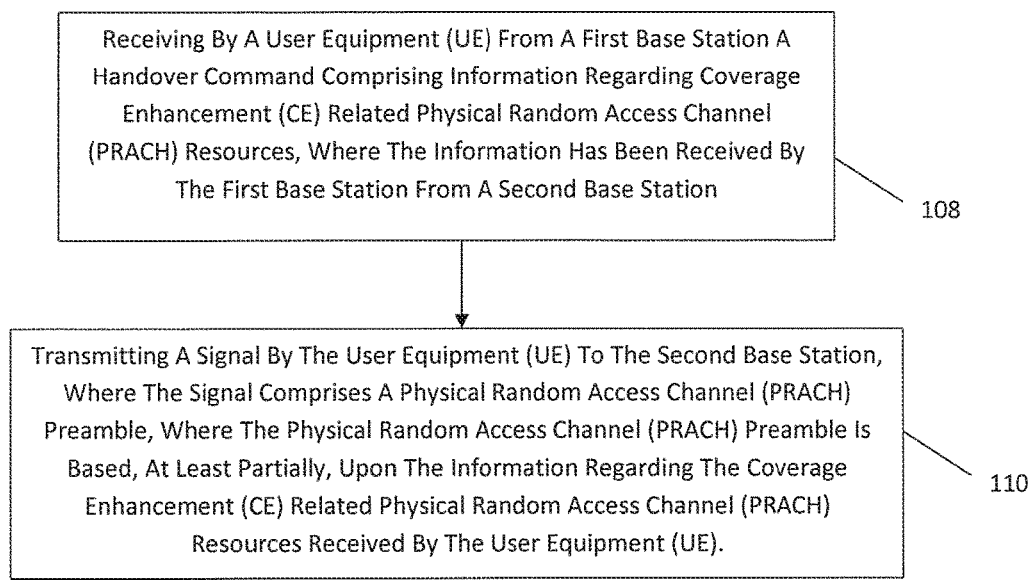
FIG. 6 is a block diagram illustrating an example method

Referring also to FIG. 6, an example method may comprise receiving by a user equipment (UE) from a first base station a handover command comprising information regarding coverage enhancement (CE) related physical random access channel (PRACH) resources, where the information has been received by the first base station from a second base station as indicated by block 108; and transmitting, as indicated by block 110, a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

An example method may comprise transmitting signals from a first base station to a second base station in a network; and during an interface setup or an interface update between the first base station and the second base station, receiving by the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The method may further comprise, at least partially based upon the information received by the first base station from the second base station, the first base station transmitting a handover request to the second base station. The transmitting of the handover request to the second base station may be based, at least partially, upon a measurement report received by the first base station from a user equipment (UE). The method may comprise the first base station determining, based at least partially the information received by the first base station from the second base station, whether or not to transmit the handover request to the second base station. The first base station, based at least partially upon the information received by the first base station from the second base station, may perform at least one of: configures a CE-specific measurement configuration; determines CE level criteria; and decides a CE level for the UE to use in the second base station. The first base station, based at least partially upon the information received by the first base station from the second base station, where the second base station is a neighboring base station, may compare the second base station to at least one other neighboring base station, and the first base station selects: the neighboring base station having a cell in which the UE is able to work in a normal coverage mode; or if UE has to work in a CE mode rather than in the normal coverage mode, the neighboring base station having a cell in which UE works with low CE level. Transmitting a handover request to the second base station may comprise at least one of a single bit Enhanced Coverage (EC) indicator and a Enhanced Coverage (EC) level indicator. Transmitting a handover request to the second base station may comprise transmitting a measurement report from the first base station to the second base station. The method may further comprise receiving from the second base station a handover request acknowledgement, where the handover request acknowledgement comprises information regarding coverage enhancement (CE) related physical random access channel (PRACH) resources. The method may further comprise transmitting by the first base station to a user equipment (UE) a radio resource control (RRC) connection reconfiguration message, where the RRC connection reconfiguration message comprises information regarding coverage enhancement (CE) related physical random access channel (PRACH) resources for the second base station.

An example apparatus may comprise at least one processor; and at least one non-transitory memory including computer program code, the at least one memory and the computer program code configured to, with the at least one processor, cause the apparatus to: transmit signals from the apparatus to a second base station in a network; and during an interface setup or an interface update between the apparatus and the second base station, where the apparatus is at least part of a first base station, receive information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The at least one memory and the computer program code may be configured to, with the at least one processor, cause the apparatus to: transmit a handover request to the second base station based, at least partially, upon the information received by the apparatus from the second base station. The transmitting of the handover request to the second base station may be based, at least partially, upon a measurement report received by the apparatus from a user equipment (UE). The at least one memory and the computer program code may be configured to, with the at least one processor, cause the apparatus to: determine, based at least partially the information received by the apparatus from the second base station, whether or not to transmit the handover request to the second base station. The at least one memory and the computer program code may be configured to, with the at least one processor, cause the apparatus to: perform, based at least partially upon the information received by the first base station from the second base station, at least one of: configure a CE-specific measurement configuration; determine CE level criteria; and decide a CE level for the UE to use in the second base station. The at least one memory and the computer program code may be configured to, with the at least one processor, cause the apparatus to: based at least partially upon the information received by the apparatus from the second base station, where the second base station is a neighboring base station, compare the second base station to at least one other neighboring base station, and the apparatus selects: the neighboring base station having a cell in which a UE is able to work in a normal coverage mode; or if the UE has to work in a CE mode rather than in the normal coverage mode, the neighboring base station having a cell in which the UE works with low CE level. The at least one memory and the computer program code may be configured to, with the at least one processor, cause the apparatus to: transmit a handover request to the second base station comprising at least one of: a single bit Enhanced Coverage (EC) indicator and a Enhanced Coverage (EC) level indicator. The at least one memory and the computer program code may be configured to, with the at least one processor, cause the apparatus to: transmit a handover request to the second base station comprising transmitting a UE measurement report from the apparatus to the second base station. The at least one memory and the computer program code may be configured to, with the at least one processor, cause the apparatus to: receive from the second base station a handover request acknowledgement, where the handover request acknowledgement comprises information regarding coverage enhancement (CE) related physical random access channel (PRACH) resources. The at least one memory and the computer program code may be configured to, with the at least one processor, cause the apparatus to: transmit by the apparatus to a user equipment (UE) a radio resource control (RRC) connection reconfiguration message, where the RRC connection reconfiguration message comprises information regarding coverage enhancement (CE) related physical random access channel (PRACH) resources for the second base station.

An example embodiment may be provided in a non-transitory program storage device readable by a machine, tangibly embodying a program of instructions executable by the machine for performing operations, the operations comprising: transmitting signals from a first base station to a second base station in a network; and during an interface setup or an interface update between the first base station and the second base station, receiving information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The operations may further comprise, based at least partially upon the information received by the first base station from the second base station, the first base station transmitting a handover request to the second base station. Transmitting of the handover request to the second base station may be based, at least partially, upon a measurement report received by the first base station from a user equipment (UE). The operations may comprise the first base station determining, based at least partially the information received by the first base station from the second base station, whether or not to transmit the handover request to the second base station. The operations may comprise the first base station, based at least partially upon the information received by the first base station from the second base station, performing at least one of: configures a CE-specific measurement configuration; determines CE level criteria; and decides a CE level for the UE to use in the second base station. The operations may comprise the first base station, based at least partially upon the information received by the first base station from the second base station, where the second base station is a neighboring base station, comparing the second base station to at least one other neighboring base station, and the first base station selects: the neighboring base station having a cell in which the UE is able to work in a normal coverage mode; or if UE has to work in a CE mode rather than in the normal coverage mode, the neighboring base station having a cell in which UE works with low CE level. Transmitting a handover request to the second base station may comprise at least one of a single bit Enhanced Coverage (EC) indicator and a Enhanced Coverage (EC) level indicator. Transmitting a handover request to the second base station may comprise transmitting a measurement report from the first base station to the second base station. The operations may further comprise receiving from the second base station a handover request acknowledgement, where the handover request acknowledgement comprises information regarding coverage enhancement (CE) related physical random access channel (PRACH) resources. The operations may further comprise transmitting by the first base station to a user equipment (UE) a radio resource control (RRC) connection reconfiguration message, where the RRC connection reconfiguration message comprises information regarding coverage enhancement (CE) related physical random access channel (PRACH) resources for the second base station.

An example method may comprise transmitting signals from a second base station to a first base station in a network; and during an interface setup or an interface update between the first base station and the second base station, transmitting by the second base station to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The method may further comprise, based upon receipt of a handover request by the second base station from the first base station, the second base station transmitting a handover request acknowledgement comprising information regarding coverage enhancement (CE) related physical random access channel (PRACH) resources. The handover request may comprise at least one of a single bit EC indicator and a EC level indicator, and where the information transmitted in the handover request acknowledgement is based, at least partially, on the indicator received by the second base station. The handover request may comprise information from a measurement report received by the first base station from a user equipment (UE). The second base station may determine a CE level for the UE based upon the measurement report.

An example apparatus may comprise at least one processor; and at least one non-transitory memory including computer program code, the at least one memory and the computer program code configured to, with the at least one processor, cause the apparatus to: transmit signals from a second base station to a first base station in a network; and during an interface setup or an interface update between the first base station and the second base station, where the apparatus is at least part of the second base station, transmit to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The at least one memory and the computer program code may be configured to, with the at least one processor, cause the apparatus to: based upon receipt of a handover request by the second base station from the first base station, the transmit a handover request acknowledgement comprising information regarding coverage enhancement (CE) related physical random access channel (PRACH) resources. The handover request may comprise at least one of a single bit EC indicator and a EC level indicator, and where the information transmitted in the handover request acknowledgement is based, at least partially, on the indicator received by the second base station. The handover request may comprise information from a measurement report received by the first base station from a user equipment (UE). The second base station may determine a CE level for the UE based upon the measurement report.

An example embodiment may be provided in a non-transitory program storage device readable by a machine, tangibly embodying a program of instructions executable by the machine for performing operations, the operations comprising transmitting signals from a second base station to a first base station in a network; and during an interface setup or an interface update between the first base station and the second base station, transmitting to the first base station information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

The operations may further comprise, based upon receipt of a handover request by the second base station from the first base station, the second base station transmitting a handover request acknowledgement comprising information regarding coverage enhancement (CE) related physical random access channel (PRACH) resources. The handover request may comprise at least one of a single bit EC indicator and a EC level indicator, and where the information transmitted in the handover request acknowledgement is based, at least partially, on the indicator received by the second base station. The handover request may comprise information from a measurement report received by the first base station from a user equipment (UE). The second base station may determine a CE level for the UE based upon the measurement report.

An example method may comprise receiving by a user equipment (UE) from a first base station a handover command comprising information regarding coverage enhancement (CE) related physical random access channel (PRACH) resources; and transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

The information regarding coverage enhancement (CE) related physical random access channel (PRACH) resources may comprise information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station. Transmitting the physical random access channel (PRACH) preamble may comprise transmitting the physical random access channel (PRACH) preamble associated with a CE level supported by the second base station. The information regarding coverage enhancement (CE) physical random access channel (PRACH) resources received by the user equipment may include a resource allocation and dedicated preambles.

An example apparatus may comprise at least one processor; and at least one non-transitory memory including computer program code, the at least one memory and the computer program code configured to, with the at least one processor, cause the apparatus to: receive from a first base station a handover command comprising information regarding coverage enhancement (CE) related physical random access channel (PRACH) resources; and transmit a signal to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

Transmitting the physical random access channel (PRACH) preamble may comprise transmitting the physical random access channel (PRACH) preamble associated with a CE level supported by the second base station. The information regarding coverage enhancement (CE) physical random access channel (PRACH) resources received by the user equipment may include a resource allocation and dedicated preambles.

An example embodiment may be provided in a non-transitory program storage device readable by a machine, tangibly embodying a program of instructions executable by the machine for performing operations, the operations comprising: receiving from a first base station a handover command comprising information regarding coverage enhancement (CE) related physical random access channel (PRACH) resources; and transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

Transmitting the physical random access channel (PRACH) preamble may comprise transmitting the physical random access channel (PRACH) preamble associated with a CE level supported by the second base station. The information regarding coverage enhancement (CE) physical random access channel (PRACH) resources received by the user equipment may include a resource allocation and dedicated preambles.

An example apparatus may be provided comprising means for transmitting signals from a first base station to a second base station in a network; and means for receiving by the first base station, during an interface setup or an interface update between the first base station and the second base station, information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

An example apparatus may be provided comprising means for transmitting signals from a second base station to a first base station in a network; and means for transmitting by the second base station to the first base station, during an interface setup or an interface update between the first base station and the second base station, information regarding at least one of: whether coverage enhancement (CE) is supported by the second base station, a maximum coverage enhancement (CE) level supported by the second base station, whether low-cost coverage enhancement (CE) is supported by the second base station, and coverage enhancement (CE) level criteria at the second base station.

An example apparatus may be provided comprising means for receiving by a user equipment (UE) from a first base station a handover command comprising information regarding coverage enhancement (CE) related physical random access channel (PRACH) resources; and means for transmitting a signal by the user equipment (UE) to the second base station, where the signal comprises a physical random access channel (PRACH) preamble, where the physical random access channel (PRACH) preamble is based, at least partially, upon the information regarding the coverage enhancement (CE) related physical random access channel (PRACH) resources received by the user equipment (UE).

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   receiving by a user equipment from a first base station a handover command comprising information regarding coverage enhancement related physical random access channel resources;
   transmitting a signal by the user equipment to a second base station, where the signal comprises a physical random access channel preamble, where the physical random access channel preamble is based, at least partially, upon the information regarding the coverage enhancement related physical random access channel resources received by the user equipment, where the information regarding coverage enhancement related physical random access channel resources comprises information regarding at least one of:
   whether coverage enhancement is supported by the second base station,
   a maximum coverage enhancement level supported by the second base station,
   whether low-cost coverage enhancement is supported by the second base station, and
   coverage enhancement level criteria at the second base station; and
   receiving by the user equipment a radio resource control connection reconfiguration message, where the radio resource control connection reconfiguration message comprises information regarding coverage enhancement related physical random access channel resources for the second base station.

2. A method as in claim 1, where transmitting the physical random access channel preamble comprises transmitting the physical random access channel preamble associated with a coverage enhancement level supported by the second base station.

3. A method as in claim 1, where the information regarding coverage enhancement physical random access channel resources received by the user equipment includes a resource allocation and dedicated preambles.

4. An apparatus comprising:
   at least one processor; and
   at least one non-transitory memory including computer program code, the at least one memory and the computer program code configured to, with the at least one processor, cause the apparatus to:
   receive from a first base station a handover command comprising information regarding coverage enhancement related physical random access channel resources;
   transmit a signal to a second base station, where the signal comprises a physical random access channel preamble, where the physical random access channel preamble is based, at least partially, upon the information regarding the received coverage enhancement related physical random access channel resources, where the information regarding coverage enhancement related physical random access channel resources comprises information regarding at least one of:
      whether coverage enhancement is supported by the second base station,
      a maximum coverage enhancement level supported by the second base station,
      whether low-cost coverage enhancement is supported by the second base station, and
      coverage enhancement level criteria at the second base station; and
   receive a radio resource control connection reconfiguration message, where the radio resource control connection reconfiguration message comprises information regarding coverage enhancement related physical random access channel resources for the second base station.

5. An apparatus as in claim 4, where transmitting the physical random access channel preamble comprises transmitting the physical random access channel preamble associated with a coverage enhancement level supported by the second base station.

6. An apparatus as in claim 4, where the information regarding the received coverage enhancement physical random access channel resources includes a resource allocation and dedicated preambles.

7. An apparatus comprising:
   at least one processor; and
   at least one non-transitory memory including computer program code, the at least one memory and the computer program code configured to, with the at least one processor, cause the apparatus to:
   transmit signals from the apparatus to a second base station in a network;
   during an interface setup or an interface update between the apparatus and the second base station, where the apparatus is at least part of a first base station, receive information regarding at least one of:
      whether coverage enhancement is supported by the second base station,
      a maximum coverage enhancement level supported by the second base station,
      whether low-cost coverage enhancement is supported by the second base station, and
      coverage enhancement level criteria at the second base station; and
   transmit by the apparatus to a user equipment a radio resource control connection reconfiguration message, where the radio resource control connection reconfiguration message comprises information regarding coverage enhancement related physical random access channel resources for the second base station.

8. An apparatus as in claim 7, where the at least one memory and the computer program code are configured to, with the at least one processor, cause the apparatus to:
   transmit a handover request to the second base station based, at least partially, upon the information received by the apparatus from the second base station.

9. An apparatus as in claim 7, where the at least one memory and the computer program code are configured to, with the at least one processor, cause the apparatus to:
   perform, based at least partially upon the information received by the first base station from the second base station, at least one of:
      configure a coverage enhancement specific measurement configuration;
      determine coverage enhancement level criteria; and
      decide a coverage enhancement level for the apparatus to use in the second base station.

10. An apparatus as in claim 7, where the at least one memory and the computer program code are configured to, with the at least one processor, cause the apparatus to:
    based at least partially upon the information received by the apparatus from the second base station, where the second base station is a neighboring base station, compare the second base station to at least one other neighboring base station, and the apparatus selects:
       the neighboring base station having a cell in which a user equipment is able to work in a normal coverage mode; or
       if the user equipment has to work in a coverage enhancement mode rather than in the normal coverage mode, the neighboring base station having a cell in which the user equipment works with low coverage enhancement level.

11. An apparatus as in claim 7, where the at least one memory and the computer program code are configured to, with the at least one processor, cause the apparatus to:
    transmit a handover request to the second base station comprising at least one of: a single bit enhanced coverage indicator and an enhanced coverage level indicator.

12. An apparatus as in claim 7, where the at least one memory and the computer program code are configured to, with the at least one processor, cause the apparatus to:
    transmit a handover request to the second base station comprising transmitting a user equipment measurement report from the apparatus to the second base station.

13. An apparatus as in claim 7, where the at least one memory and the computer program code are configured to, with the at least one processor, cause the apparatus to:
    receive from the second base station a handover request acknowledgement, where the handover request acknowledgement comprises information regarding coverage enhancement related physical random access channel resources.

14. An apparatus comprising:
    at least one processor; and
    at least one non-transitory memory including computer program code, the at least one memory and the computer program code configured to, with the at least one processor, cause the apparatus to:

transmit signals from a second base station to a first base station in a network;

during an interface setup or an interface update between the first base station and the second base station, where the apparatus is at least part of the second base station, transmit to the first base station information regarding at least one of:
- whether coverage enhancement is supported by the second base station,
- a maximum coverage enhancement level supported by the second base station,
- whether low-cost coverage enhancement is supported by the second base station, and
- coverage enhancement level criteria at the second base station; and generate by the apparatus a radio resource control connection reconfiguration message, where the radio resource control connection reconfiguration message comprises information regarding coverage enhancement related physical random access channel resources for the second base station.

15. An apparatus as in claim 14, where the at least one memory and the computer program code are configured to, with the at least one processor, cause the apparatus to:

based upon receipt of a handover request by the second base station from the first base station, transmit a handover request acknowledgement comprising information regarding coverage enhancement related physical random access channel resources.

16. An apparatus as in claim 15, where the handover request comprises at least one of a single bit enhanced coverage indicator and an enhanced coverage level indicator, and where the information transmitted in the handover request acknowledgement is based, at least partially, on the indicator received by the second base station.

17. An apparatus as in claim 14, where the second base station determines a coverage enhancement level for a user equipment based upon a measurement report.

* * * * *

UNITED STATES PATENT AND TRADEMARK OFFICE
CERTIFICATE OF CORRECTION

Page 1 of 1

PATENT NO. : 10,244,450 B2
APPLICATION NO. : 15/333406
DATED : March 26, 2019
INVENTOR(S) : Yanji Zhang et al.

It is certified that error appears in the above-identified patent and that said Letters Patent is hereby corrected as shown below:

In the Specification

Column 6, Lines 57-58, "target" should be deleted and --source-- should be inserted.

Signed and Sealed this
Fourth Day of August, 2020

Andrei Iancu
*Director of the United States Patent and Trademark Office*